(12) United States Patent
Fullana Font et al.

(10) Patent No.: US 12,258,451 B2
(45) Date of Patent: Mar. 25, 2025

(54) METHOD AND SYSTEM FOR THE ELIMINATION OF ODOURS IN RECYCLED PLASTICS

(71) Applicant: UNIVERSIDAD DE ALICANTE, San Vicente del Raspeig (ES)

(72) Inventors: Andrés Fullana Font, San Vicente del Raspeig (ES); Andrea Cabanes Gil, San Vicente del Raspeig (ES)

(73) Assignee: UNIVERSIDAD DE ALICANTE, San Vicente del Raspeig (ES)

( * ) Notice: Subject to any disclaimer, the term of this patent is extended or adjusted under 35 U.S.C. 154(b) by 681 days.

(21) Appl. No.: 17/596,049

(22) PCT Filed: Dec. 4, 2019

(86) PCT No.: PCT/ES2019/070824
§ 371 (c)(1),
(2) Date: Dec. 2, 2021

(87) PCT Pub. No.: WO2020/245476
PCT Pub. Date: Dec. 10, 2020

(65) Prior Publication Data
US 2022/0298323 A1 Sep. 22, 2022

(30) Foreign Application Priority Data
Jun. 4, 2019 (ES) ................ ES201930501

(51) Int. Cl.
*C08J 11/06* (2006.01)
*B01D 3/38* (2006.01)
(Continued)

(52) U.S. Cl.
CPC ............... *C08J 11/06* (2013.01); *B01D 3/38* (2013.01); *B09B 3/35* (2022.01); *B09B 3/45* (2022.01);
(Continued)

(58) Field of Classification Search
CPC ......... C08J 11/06; C08J 2300/30; B09B 3/45; B09B 3/70; B09B 3/35; B09B 2101/75;
(Continued)

(56) References Cited

U.S. PATENT DOCUMENTS 5,089,091 A * 2/1992 Fox ................. C08G 65/46
159/DIG. 10
9,550,132 B2 * 1/2017 Bergstra ............. C08F 6/005
(Continued)

FOREIGN PATENT DOCUMENTS

WO 2002060270 A1 8/2002
WO 2002065845 A1 8/2002
(Continued)

OTHER PUBLICATIONS

Bledzki, A. K., et al., "Odour Reduction on plastics and its measurement", Polymer Testing, 1999, vol. 18, pp. 63-71.
(Continued)

*Primary Examiner* — Michael M. Bernshteyn
(74) *Attorney, Agent, or Firm* — ArentFox Schiff LLP; Richard Berman

(57) ABSTRACT

The invention relates to a method and system for the elimination of odours in recycled plastic materials, which comprises the steps of: separating and conditioning the plastic; shredding the plastic by means of a bladed shredded, which reduces the plastic into powder-sized particles; chemically washing with a surfactant, which is carried out in a stirring tank; rinsing the plastic material to eliminate dirt and the chemicals used, which is carried out in a rinsing reactor; mechanically drying the clean material in a dryer; and deodorising the plastic, wherein volatile organic compounds (VOCs) are removed from the clean, dry material by means of steam distillation, deodorisation being performed
(Continued)

in a steam distillation column, the VOC-free plastic exiting through the bottom part of the column.

15 Claims, 1 Drawing Sheet

(51) Int. Cl.
  *B09B 3/35* (2022.01)
  *B09B 3/45* (2022.01)
  *B09B 3/70* (2022.01)
  *B09B 101/75* (2022.01)
  *B29B 17/02* (2006.01)
  *B29B 17/04* (2006.01)
  *B29K 105/26* (2006.01)
(52) U.S. Cl.
  CPC ............. *B09B 3/70* (2022.01); *B29B 17/02* (2013.01); *B29B 17/0404* (2013.01); *B09B 2101/75* (2022.01); *B29K 2105/26* (2013.01); *C08J 2300/30* (2013.01)
(58) Field of Classification Search
  CPC ....... B01D 3/38; B29B 17/02; B29B 17/0404; B29K 2105/26
  USPC .......................................................... 521/40
  See application file for complete search history.

(56) References Cited

U.S. PATENT DOCUMENTS

| | | | |
|---|---|---|---|
| 2014/0202847 A1* | 7/2014 | Bergstra | B29B 9/16 |
| | | | 203/96 |
| 2022/0356323 A1* | 11/2022 | de Carvalho | B29B 17/00 |

FOREIGN PATENT DOCUMENTS

| | | | | |
|---|---|---|---|---|
| WO | WO-02060270 A1 * | 8/2002 | | A23D 9/007 |
| WO | WO-02065845 A1 * | 8/2002 | | A23D 9/007 |
| WO | WO-2013072035 A1 * | 5/2013 | | B01D 3/02 |

OTHER PUBLICATIONS

ISA/ES, International Search Report and Written Opinion mailed Feb. 21, 2020 issued in PCT Application No. PCT/ES2019/070824.

* cited by examiner

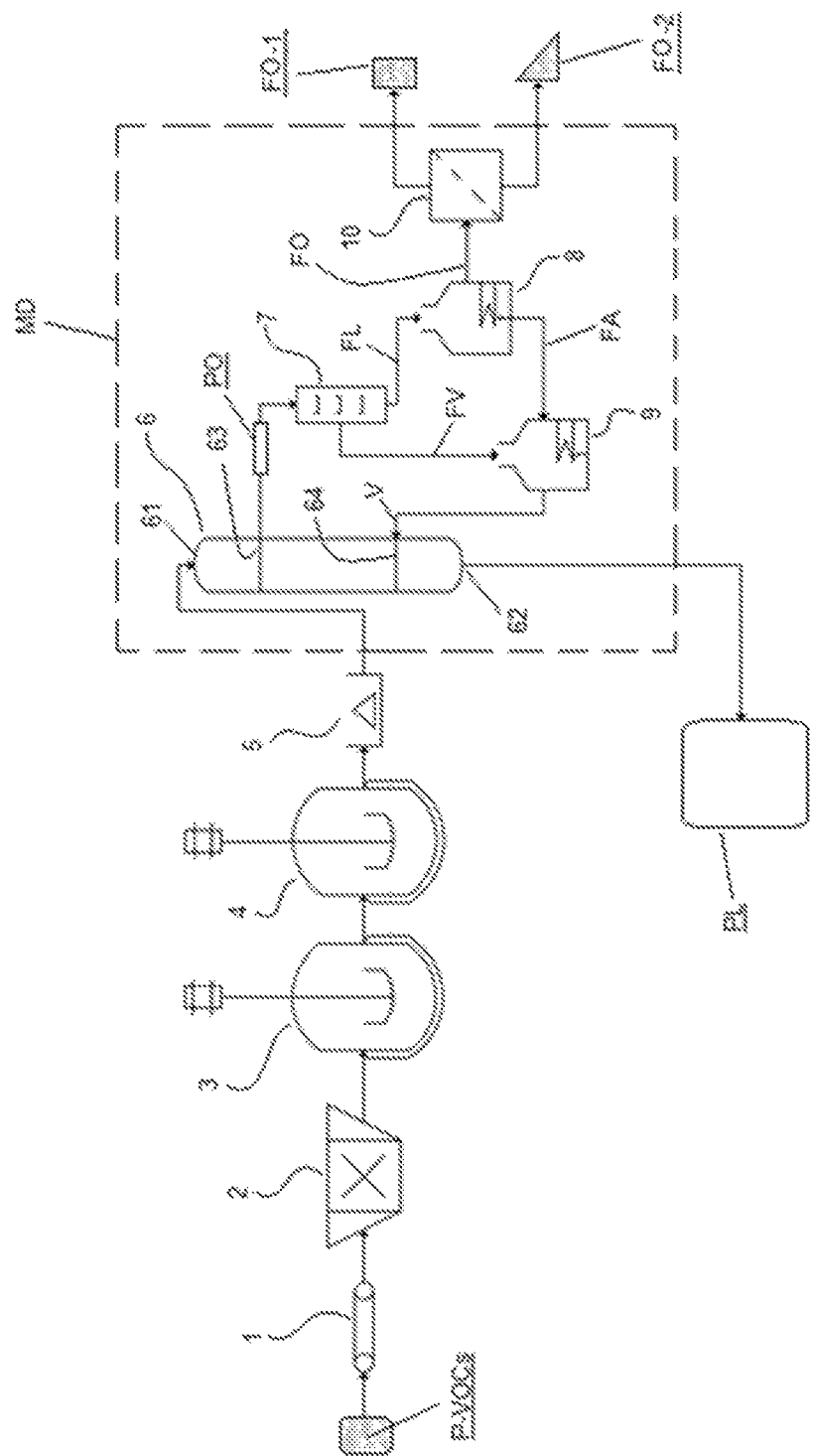

METHOD AND SYSTEM FOR THE ELIMINATION OF ODOURS IN RECYCLED PLASTICS

CROSS-REFERENCE TO RELATED APPLICATIONS

This application is a 35 U.S.C. § 371 National Phase of PCT Application No. PCT/ES2019/070824, filed Dec. 4, 2019, which claims priority to Spanish Application No. P201930501, filed Jun. 4, 2019, the disclosures of each of which are incorporated herein by reference in their entirety.

FIELD OF THE INVENTION

The present invention relates to a method for the elimination of odours in recycled plastic materials based on the removal of volatile organic compounds by means of steam distillation, in addition to defining the system required to do so.

The present invention falls within the processes of eliminating odours in plastics, and specifically relates to a process that uses water steam to clean plastics from domestic and industrial waste.

The objective of the invention is to eliminate pollutants, and with them, volatile organic compounds (VOCs) that impart a foul odour to recycled plastics. This process is based on the removal of VOCs by means of steam distillation. This invention applies to plastics of varied nature, such as polyethylene (PE), polypropylene (PP), polyester (PET), etc. from plastic waste, whether of industrial or domestic origin.

STATE OF THE ART

It is known that the demand for plastic packaging is increasing and with it the volume of plastic in landfills. While plastic waste from industries can be treated by means of mechanical recycling, obtaining a reusable high-quality material as polymeric raw material, domestic plastic waste has a high content of food remains and cleaning products that are absorbed into the polymeric matrix, becoming pollutants and causing a foul odour. These odoriferous substances are volatile organic compounds that currently cannot be eliminated by means of conventional washing, which limits the reuse thereof as raw material for products for exterior use.

Currently, conventional mechanical recycling consists of a selective classification of plastic waste based on the nature of the polymer, washing with water, to which reagents such as soda, surfactants and oxidants can be added, and finally it goes through a mechanical drying step prior to the extrusion step wherein the recycled pellets are obtained. There are various additives that can be added during the extrusion step in order to encapsulate or remove the VOCs contained in the polymeric matrix, but which have not been shown to be effective in the elimination of odour.

In this sense, some documents related to this concept are known, such as patent CN104552866, which relates to a process for washing plastic material based on a high-speed stirring tank, which then passes through an extruder wherein the plastic is melted and purified water is added, which forms an azeotrope with the mixture of melted plastic. The azeotrope is discharged together with the volatiles of the plastic and the water steam through the vacuum outlet of the extruder, so that the intensity of the polymer's odour is reduced.

The invention WO0110721 is also known which relates to a method for reducing odours by means of ionising rays in an atmosphere that is not necessarily inert.

The invention JPS58196235 relates to a washing process in which the polyolefins are washed with hot water containing dissolved oxygen for the elimination of odours in the plastic.

The invention CN107627487 relates to a washing process to eliminate odours in plastic waste. The process consists of the steps of cutting the plastic waste; washing with neutral surfactant and subsequent rinsing; washing with sodium hydroxide and subsequent rinsing; degradation of the plastic particles by means of hyphae fungi and subsequent rinsing and drying; (v) grinding the plastic particles to powder size; mixing the plastic powder with a sodium hydroxide solution and subsequent rinsing; extrusion of the powder material to obtain the pellets.

Taking into account the existing background in this field of the art, processes that are based on the elimination of odours by means of steam distillation are not known. By means of this process of eliminating odours in plastics from domestic and industrial waste, it is possible to resolve the problems of conventional washing and to increase the reuse of said plastics as raw material for products for subsequent use.

DESCRIPTION OF THE INVENTION

As has been mentioned above, due to the continuous increase in the use of plastic products, the generation of this waste has become a global problem in today's society, so that the recycling and subsequent use thereof as a raw material is required if plastic in landfills is to be reduced. At the same time, using plastic as a raw material enables reducing production costs in the industries of the sector, in addition to increasing the added value of the product, since awareness about caring for the environment and with it the demand for recycled products in the market is increasing.

The object of the present invention is to increase the quality of recycled plastics after the elimination of odours by means of the removal of the volatile organic compounds with water steam. These organic compounds are found both inside the polymeric matrix and on the surface of the plastic. The solution that is described in detail below is based on the fact that removal with steam favours the internal diffusion of volatile compounds due to the working temperature, as well as lowers the boiling point of volatile organic compounds as they are immiscible with water and, therefore, favours the evaporation thereof from the surface of the polymer towards the gaseous phase and consequent elimination.

For this, the method requires a system or equipment that comprises means for selecting and shredding the material, among which a separation system and a bladed shredder stand out; washing means, among which a washing tank, a rinsing tank and a dryer stand out; and a deodorising module, which consists of a system for the elimination of the volatile organic compounds contained in the plastic and the recovery of the same.

This deodorising module is a hermetically closed circuit that enables temperature control and heat recovery. Within this system there is a column wherein the plastic to be deodorised is inserted, in which the plastic moves against the flow with the steam that enters through the base of the column and exits through the head. At this point it must be taken into account that the boiling point of volatile organic compounds is always below the boiling point of water and therefore, working at atmospheric pressure, it is enough to feed the module with steam at 100 degrees. In the event of working above atmospheric pressure, the boiling point of the water increases and with it the temperature of the system, but work must always be carried out below the plastic degradation temperature. As for the flow rate, it depends on the dimensions of the reactor; therefore, this invention is not limited to a range of flow rates.

The steam that exits through the head of the column after having been in contact with the recycled plastic and containing VOCs passes through a droplet separator that eliminates the organic phase content. The droplet separator is a unit independent from the distillation column and the condensation of organic compounds takes place therein, i.e., the organic compounds are trapped in the droplet separator by condensation while the clean, aqueous phase remains in the form of steam.

The steam portion that remains clean is returned to the steam boiler directly and the liquid portion containing water and VOCs is taken to an isothermal tank, wherein the aqueous phase is separated from the organic portion by decanting. The aqueous phase is fed back to the boiler, thus closing the water circuit.

The organic phase is fed to a separator wherein water dissolved in the organic phase is obtained through one side and the organic compounds are obtained through the other. This separator can be a distillation column wherein the water evaporates, separating it from the organic compounds; a hydrophobic membrane wherein only organic compounds pass through the membrane or separation by means of membrane by molecular size, which is possible if the size of the organic molecules differs significantly from the size of the water molecule; or equivalent devices or a combination thereof. In any case, the waste water can be used to re-feed the boiler, or for any other use.

It has been observed that, in addition, other advantages are achieved, and, generally, this organic phase is composed of essential oils that can be marketed, since they have a high value in the industry, such as limonene or pinene. If these oils are not to be marketed, the organic phase can be reused as fuel for steam generation.

In any case, the development of the process for eliminating VOCs that cause foul odour in recycled domestic plastic is carried out within a mechanical recycling process. It is implemented directly after the washing line or after extrusion and pelletising, as the last treatment, wherein the steps described below are envisaged:

Step 1: Separation

The fraction of plastic material coming from landfills or from the domestic recycled plastic container reaches the plastic waste treatment plant and is separated by identification by means of near infrared spectroscopy (NIR), mid-infrared spectroscopy (MIR), infrared thermography IR; laser-induced breakdown spectroscopy (LIBS); or X-ray fluorescence.

Step 2: Shredding

The bags, films, bottles and other containers that arrive at the plant, after being separated by material type, are introduced into a bladed shredder to cut the containers into flake form, or in cases where it is required, a cryogenic mill or shredder that reduces the particles to powder size can be used.

Step 3: Chemical Washing

Washing with surfactant is performed to eliminate dirt from the plastic material which is adhered to the surface. Both anionic and cationic or neutral surfactants can be used. The washing is performed in a stirred tank-type reactor.

Step 4: Rinsing

The plastic material is rinsed to eliminate dirt and the chemicals used.

Step 5: Drying

The drying step is performed after rinsing the plastic material to eliminate the moisture contained therein as much as possible. Drying will be done mechanically.

Step 6: Deodorising

This step is carried out in the deodorising module, wherein the odour produced by the VOCs that are adhered to the already clean and dry material is eliminated. This process can be performed before or after extrusion:

If the material that is introduced in the recycling process is the volatile fraction of plastic waste from bags and films, then it would be better to perform the deodorising step after extrusion for mechanical reasons.

In the event that the material entering the plant is rigid from bottles, then the deodorising process can be applied before or after extrusion, since said material has high density in both cases and does not volatilise, giving rise to loss of material as would occur in the case of films.

It is possible that the deodorising module is independent from the recycling process. In this case, the deodorising system acts as a module that is totally independent from the recycling process and its input into the process is the recycled pellets, i.e., it is a system for improving the quality of the product already recycled by other companies.

Finally, it should be noted that, throughout the description and claims, the term "comprises" and its variants are not intended to exclude other technical features or additional elements. Furthermore, in order to complete the description and to make the features of the invention more readily understandable, a figure is presented wherein the following is represented by way of illustration and not limitation:

FIG. 1 is a schematic diagram of the different elements of the method for carrying out the elimination of odours in recycled plastic materials.

DETAILED DESCRIPTION OF AN EMBODIMENT

The method for the elimination of odours in recycled plastic materials comprises the following steps:

a) separating the recycled plastic material (P-VOCs) by means of identification in a plant for separation by identification (1);

b) shredding the plastic in a shredder (2);

c) chemically washing the shredded plastic with surfactant in a stirred tank (3);

d) rinsing the plastic material to eliminate dirt and the chemicals used in chemical washing in a rinsing tank (4);

e) drying the rinsed material in a mechanical dryer (5);

f) deodorising the dry plastic material wherein:

the plastic material is introduced through the upper part (61) of a distillation column (6);

steam inlet (V), coming from a boiler (9), through the bottom lateral part (64) of the distillation column (6);

the plastic material falls by the effect of gravity along the distillation column (6), the plastic material comes into contact with the steam (V) and the organic components are removed from the plastic material by means of distillation;

there is an outlet for organic product (PO), which comprises water steam and organic components VOCs, through the upper lateral part (63) of the distillation column (6); and the VOC-free plastic (PL) exits through the bottom part (62) of the distillation column (6).

Taking into account the steps of the method, and as seen in FIG. 1, the system for the elimination of odours in recycled plastic materials comprises the following equipment:
- a plant for separation by identification (1) wherein the plastic with VOCs (P-VOCs) enters;
- a shredder (2) of the bladed or cryogenic mill type, for reducing the plastic material;
- a stirred tank (3) for chemical washing, for washing the shredded material with surfactant; a rinsing tank (4), for rinsing the washed material; a mechanical dryer (5), for drying the rinsed material; and a deodorising module (MD) comprising:
  - a distillation column (6) through which the dry material enters, wherein the organic components of the plastic material are removed by means of steam distillation (V), and through which the VOC- and odour-free plastic (PL) exits;
  - a droplet separator (7) that receives the organic product (PO) removed by means of steam distillation;
  - an isothermal tank (8) that receives a liquid fraction (FL) obtained from the droplet separator (7);
  - a separator (10) that receives a portion of organic product (PO') from the isothermal tank (8); and
  - a steam boiler (9) that supplies steam (V) to the distillation column (6); and that receives a steam fraction (FV) from the droplet separator (7) and an aqueous phase (FA) from the isothermal tank (8).

Further describing each step, and in turn, further describing FIG. 1, the method and the system required to carry out the method comprises:

Step 1. Separation of the recycled plastic

The fraction of plastic material coming from landfills or from the domestic recycled plastic container (P-VOCs), wherein the plastic with VOCs is selected from polyethylene—PE; polypropylene—PP; and polyester—PET, is introduced into a system or plant for separation by identification (1), wherein the material is identified by means of near infrared spectroscopy—NIR; mid-infrared spectroscop—MIR; infrared thermography IR; laser-induced breakdown spectroscopy—LIBS; or X-ray fluorescence.

Step 2: Shredding

Once separated, the bags, films, bottles and other containers that arrive at the plant are introduced into a shredder (2) wherein the size of the plastic particles is reduced. Shredder (2) that can be a bladed-type shredder if the plastic is to be processed in flake form; or it can be of the cryogenic mill type if wanting to work with or reduce the particle size to less than 1 mm.

Step 3: Chemical washing

The stream of cut plastic enters the washing tank (3), wherein a washing with surfactant is performed to eliminate dirt from the plastic material which is adhered to the surface. Both anionic and cationic or neutral surfactants can be used. The washing is performed in a stirred tank-type reactor.

Step 4: Rinsing

The plastic material is rinsed to eliminate dirt and the chemicals used. To do this, the product that comes out of the chemical washing enters a rinsing tank (4) to eliminate the chemicals used in the chemical washing and the remaining dirt, wherein said rinsing product is water.

Step 5: Drying

Once the dirt and the chemical compounds have been eliminated after rinsing, a clean material is obtained that is mechanically dried by means of centrifugation, pressure or compressed air in a mechanical dryer (5). Drying is at room temperature and in a closed system. In this drying step, the moisture contained is eliminated as much as possible, although it is not required that it be totally eliminated.

Step 6: Deodorising

The stream of clean and dry plastic product, but with an odour, is introduced into a deodorising module (MD) comprising, among others, a distillation column (6).

Said plastic with odour, and with variable size depending on the shredding, although preferably of powder size, enters the head (61) of the steam distillation column and the clean product, i.e., the VOC- and odour-free plastic (PL) and odours exits from the bottom part (62) of the column. These plastic particles fall by the effect of gravity and are subjected to the contact of the steam. It is not an object of the present invention, but inside the column there may be plates or other devices that prevent direct fall and that cause the particles to fall more slowly, therefore prolonging the time of exposure to the steam.

The steam (V) enters through the bottom lateral part (64) of the column and exits through the upper lateral part (63) of the same. This steam (V) entering through the bottom lateral part (64) is fed by a steam boiler (9) adjacent to the column (6).

The stream of steam that exits through the upper part (after having been in contact with the odorous plastic) contains a mixture of water steam and organic compounds, i.e., it is a mixture of organic product (PO). By means of a conduit, this mixture is introduced into a droplet separator (7). After the droplet separator (7), the steam fraction (FV) exits through one side and the liquid fraction (FL) through the other.

The steam fraction (FV) is made up of water and is recirculated to the steam boiler (9).

The liquid fraction (FL) is a condensed product that is made up of the organic phase together with the water dissolved therein. This condensed product is channelled to an isothermal tank (8) wherein the organic phase (FO) is separated from the aqueous phase (FA) by decanting, without the need for filters.

The stream of the aqueous phase (FA) is made up of condensed water that is re-introduced into the steam boiler (9), optimising the performance of the system.

The stream of the organic phase (FO) contains organic compounds and water in solution. This stream is channelled to a separator (10) that separates the water (FO-2) from the rest of the organic compounds (FO-1)

As mentioned above, apart from obtaining a clean product that is a VOC- and odour-free plastic (PL) that is reusable for other uses (main objective of the present invention); an organic product (PO) is finally generated that is also reusable, wherein there is water (FO-2) that can be used externally for other uses, also being able to be reused in order to be recirculated to the boiler (9); and wherein there are organic remains (FO-1) essentially made up of essential oils that can be marketed, or that can even be reused as fuel for steam generation.

The invention claimed is:

1. A system for eliminating odors in recycled plastic materials comprising:
   - a plant for separation by identification wherein a plastic material with volatile organic compounds enters;
   - a shredder for reducing a size of the plastic material to provide a shredded material;
   - a washing tank, for chemically washing the shredded material with surfactant to provide a washed material;

a rinsing tank, for rinsing the washed material to provide a rinsed material;

a mechanical dryer, for drying the rinsed material to provide a dry material; and a deodorizing module (MD) comprising:

a distillation column through which the dry material enters, wherein the volatile organic compounds of the plastic material are removed by means of steam distillation, and through which volatile organic compound- and odor-free plastic exits;

a droplet separator that receives organic product removed by the means of steam distillation;

an isothermal tank that receives a liquid fraction obtained from the droplet separator;

a separator that receives a portion of an organic phase from the isothermal tank; and a steam boiler that supplies steam to the distillation column; and that receives a steam fraction from the droplet separator and an aqueous phase from the isothermal tank.

2. The system for the elimination of odors in recycled plastic materials, according to claim 1, wherein the shredder is a bladed shredder or a cryogenic mill.

3. The system for the elimination of odors in recycled plastic materials, according to claim 1, wherein the washing tank is a stirred tank.

4. The system for the elimination of odors in recycled plastic materials, according to claim 1, wherein the separator is a distillation column, a hydrophobic membrane or a combination thereof.

5. A method for eliminating odors in recycled plastic materials using the system of claim 1, the method comprising:

a) separating the plastic material by means of the plant for separation by identification;

b) shredding the plastic material in the shredder to provide the shredded material;

c) chemically washing the shredded material with the surfactant in the washing tank;

d) rinsing the plastic material to eliminate dirt and chemicals used in chemical washing in the rinsing tank to provide the rinsed materials;

e) drying the rinsed material in the mechanical dryer to provide the dry material; and f) deodorizing the dry material wherein:

the plastic material is introduced through an upper part of the distillation column, steam from the steam boiler is supplied to the distillation column through a bottom lateral part of the distillation column, the plastic material falls by the effect of gravity along the distillation column, the plastic material comes into contact with the steam, the volatile organic components are removed from the plastic material by means of distillation, there is an outlet for organic product, which comprises water steam and volatile organic components, through an upper lateral part of the distillation column, and the volatile organic compound- and odor-free plastic exits through a bottom part of the distillation column.

6. The method according to claim 5, wherein the plastic material is selected from polyethylene, polypropylene, and polyester.

7. The method according to claim 5, wherein the identification is performed by means of near infrared spectroscopy, mid-infrared spectroscopy, infrared thermography, laser-induced breakdown spectroscopy, or X-ray fluorescence.

8. The method according to claim 5, wherein the surfactant is cationic, anionic, or neutral.

9. The method according to claim 5, wherein the rinsing is with water.

10. The method according to claim 5, wherein the drying is performed mechanically at room temperature.

11. The method according to claim 5, wherein, while deodorizing, the organic product that exits through the upper lateral part of the distillation column is channeled to a droplet separator, and wherein, in the droplet separator, there is a separation of the organic product into a steam fraction and a liquid fraction.

12. The method according to claim 11, wherein the steam fraction feeds the steam boiler.

13. The method according to claim 11, wherein the liquid fraction feeds an isothermal tank wherein the liquid fraction is separated by decanting into an aqueous phase and an organic phase comprising organic compounds and dissolved water.

14. The method according to claim 13, wherein the aqueous phase feeds the steam boiler.

15. The method according to claim 13, wherein the organic phase feeds a separator wherein a part of water is separated from a remaining portion of the organic compounds.

* * * * *